Patented Oct. 11, 1949

2,484,606

UNITED STATES PATENT OFFICE 2,484,606

2 - SULFANILAMIDO - PYRIMIDINES HAVING AN ACETAL SUBSTITUENT IN THE PYRIMIDINE NUCLEUS

William Braker, Newark, N. J., assignor to E. R. Squibb & Sons, New York, N. Y., a corporation of New York No Drawing. Application May 20, 1944, Serial No. 536,599

7 Claims. (Cl. 260—239.6)

This invention relates to, and has for its object the provision of: [A] compounds of the main general formula

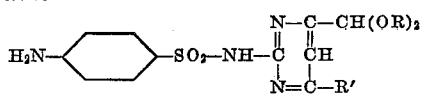

wherein R represents a hydrocarbon (preferably lower-alkyl) group, and R' represents a member of the class consisting of hydrogen, (hydrocarbon group)-O-, (hydrocarbon group)-S-, (hydrocarbon group)-O-(hydrocarbon group)-, and hydrocarbon group, the hydrocarbon group being preferably a lower-alkyl group; [B] salts of these compounds; and [C] methods of preparing [A] and [B]. These compounds (and salts) are valuable chemotherapeutic agents.

The invention also comprises compounds of the main general formula with a group convertible into an amino group (e. g., an acyl-amino or nitro group) in place of the amino group, as well as other intermediates formed in the production of the compounds of the main general formula.

The compounds of the main general formula may be prepared as follows: (1) condensing a compound of the general formula

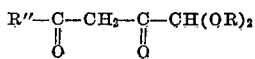

wherein R has the meaning given hereinbefore, and R" represents a member of the class consisting of hydrocarbon, (hydrocarbon group)-O- and (hydrocarbon group)-O-(hydrocarbon group)-, with guanidine (which term, as herein employed, comprehends also such guanidine-yielding salts as the carbonate); (2) converting the resulting compound (except when R" in the starting material is a hydrocarbon group) into a compound of the general formula

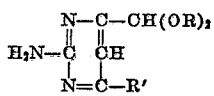

wherein R and R' have the meaning given hereinbefore; and (3) reacting the resulting substituted pyrimidine with a p-acylamino-benzene-sulfonyl halide; the free amino compound being obtained by saponification or hydrolysis of the resulting acylamino compound. Alternatively, the compounds of the main general formula may be prepared by condensing the aforesaid substituted pyrimidine with a p-nitro-benzene-sulfonyl halide, and reducing the resulting nitro compound to the corresponding amino compound.

The compounds of the main general formula readily form salts with bases, for example, alkali-metal (including ammonium), alkaline-earth-metal, and organic-ammonium bases.

The reactants of the general formula

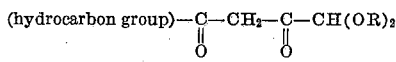

wherein R has the meaning given hereinbefore, may conveniently be obtained by reacting a compound of the general formula

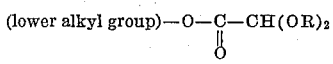

with a compound of the general formula

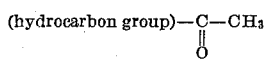

in the presence of an alkaline condensing agent, inter alia sodium, sodium methoxide, sodium ethoxide, potassium, sodium amide, and triphenylmethyl sodium.

The following examples are illustrative of the invention:

EXAMPLE 1

(a) *Preparation of 2-amino-4-(diethoxy-methyl)-6-pyrimidone*

3.5 g. sodium is dissolved in 100 cc. absolute alcohol, 13.5 g. guanidine carbonate is added, and the mixture is heated on a steam bath for 10 minutes. Then 21 g. ethyl α,α-diethoxy-aceto-acetate is added dropwise over a period of 2 hours, and the mixture is refluxed for about 12 hours and allowed to stand overnight. The alcohol solution is then concentrated under reduced pressure, and the solid obtained is dissolved in water, and acidified with acetic acid; and the resulting precipitate is filtered off, washed, and dried (yield 71.5%). After recrystallization from water, the product melts at 196–197° C.

(b) *Preparation of 2-amino-4-(diethoxy-methyl)-6-chloro-pyrimidine*

30 g. 2-amino-4-(diethoxy-methyl)-6-pyrimidone and 90 cc. phosphorus oxychloride are combined at room temperature and stirred for three hours. The mixture is then poured upon finely chopped ice (the temperature not exceeding 10° C.), and the solution is made ammoniacal with ammonium hydroxide, keeping the temperature at 20° C. The resulting precipitate is filtered off, washed with water and dried (yield 16.5 g.; M. P. 100° C.).

(c) Preparation of 2-amino-4-(diethoxy-methyl)-pyrimidine 41 g. 2-amino-4-(diethoxy-methyl)-6-chloro-pyrimidine is dissolved in 350 cc. methanol containing 30 cc. of 10% methanolic ammonia, 8 g. 5% palladium on charcoal is added, and the mixture is shaken with hydrogen at atmospheric pressure until the theoretical amount of hydrogen has been absorbed. The solution is then filtered to remove the catalyst, and the filtrate is cooled in a solid $CO_2$ and alcohol bath. The product crystallizes out (M. P. 132° C.). After recrystallization from water, the product melts at 136° C.

(d) Preparation of 2-($N^4$-acetyl-sulfanilamido)-4-(diethoxy-methyl)-pyrimidine 5 g. 2-amino-4-(diethoxy-methyl)-pyrimidine is dissolved in 100 cc. pyridine at 30° C.; then 6 g. acetyl-sulfanilyl chloride is added with stirring at 30° C., and the mixture is allowed to stand overnight. The mixture is then diluted with an equal volume of water and the resulting mixture distilled under reduced pressure, the temperature being kept below 60° C. The residual solid is filtered off, washed with water, and dried (yield 3.5 g.; M. P. 190° C.). After recrystallization from 50% alcohol, the product melts at 191–192° C.

(e) Preparation of 2-sulfanilamido-4-(diethoxy-methyl)-pyrimidine 3 g. 2-($N^4$-acetyl-sulfanilamido)-4-(diethoxy-methyl)-pyrimidine is dissolved in a solution of 1 g. sodium hydroxide in 12 cc. water, and refluxed for 1½ hours. The solution is then cooled, filtered, and made acid with acetic acid; and the resulting precipitate is filtered off, washed, and dried (yield 2 g.). After recrystallization from alcohol, the product melts at 200–201° C. (with decomposition).

EXAMPLE 2

(a) Preparation of 1,1-diethoxy-2,4-pentanedione 6.85 g. sodium shot is suspended in 150 cc. benzene and the mixture is cooled to 0° C. 67.2 g. ethyl diethoxy-acetate is added thereto, the mixture is cooled to −5° C., and 20 g. acetone is added with stirring over a period of ½ hour. The mixture is stirred at 0° C. for ½ hour, then at −5 to 0° for three hours, and then allowed to stand overnight in the ice box. The benzene is removed under reduced pressure, 75 cc. water is added, and the mixture is made acid with acetic acid. The mixture is then extracted with five 150 cc. portions of ether; the combined extracts are washed with saturated sodium chloride solution, and then dried over magnesium sulfate; and the ether is removed by distillation, and the residue fractionated. 35.5 g. of the product, boiling at 90–92° at 5 mm., is obtained.

(b) Preparation of 2-amino-4-(diethoxy-methyl)-6-methyl-pyrimidine 7.5 g. 1,1-diethoxy-2,4-pentanedione and 5.4 g. guanidine carbonate are heated on an oil bath at 120° C. for two hours. The mixture is then cooled, and 30 cc. of water and 6 cc. glacial acetic acid are added; and the resulting precipitate is filtered off, washed, and dried (yield 5.7 g.; M. P. 87–88° C.). After recrystallization from hexane, the product melts at 87.5–88.5° C.

(c) Preparation of 2-($N^4$-acetyl-sulfanilamido)-4-(diethoxy-methyl)-6-methyl-pyrimidine 2.8 g. 2-amino-4-(diethoxy-methyl)-6-methyl-pyrimidine is dissolved in 10 cc. pyridine and cooled to 10–15° C. Then 3.5 g. acetyl-sulfanilyl chloride is added with stirring at 10–15° C., and the mixture is allowed to stand overnight. The pyridine is removed under reduced pressure, and two 10 cc. portions of water are added to the residue, each time distilling to dryness under reduced pressure; and the residue is filtered off, washed with water, and dried. It may be recrystallized from alcohol.

(d) Preparation of 2-sulfanilamido-4-(diethoxy-methyl)-6-methyl-pyrimidine 5.3 g. 2-($N^4$-acetyl-sulfanilamido-4-(diethoxy-methyl)-6-methyl-pyrimidine is refluxed in 20 cc. 10% sodium hydroxide for one hour, and the solution is cooled and made acid to litmus with acetic acid. The resulting precipitate is filtered off, washed with water, and dried. It may be recrystallized from acetic acid.

EXAMPLE 3

(a) Preparation of 2-amino-4-(diethoxy-methyl)-6-methoxy-pyrimidine 9 g. 2-amino-4-(diethoxy-methyl)-6-chloro-pyrimidine [cf. Example 1(b)], 2.7 g. sodium, and 100 cc. methyl alcohol are refluxed together for 3 hours; and the methanol is removed by distillation under reduced pressure. The residue is cooled, 50 cc. cold water is added, and the mixture is extracted with ether; the ether solution is dried over magnesium sulfate and concentrated; and the residue is extracted with hexane. The product, obtained in a yield of 6.5 g., melts at 84° C., the melting point being unchanged by recrystallization from a mixture of ether and hexane.

(b) Preparation of 2-($N^4$-acetyl-sulfanilamido)-4-(diethoxy-methyl)-6-methoxy-pyrimidine 38 g. 2-amino-4-(diethoxy-methyl)-6-methoxy-pyrimidine is dissolved in 150 cc. pyridine, 39 g. acetyl-sulfanilyl chloride is added at room temperature, and the reaction mixture is allowed to stand for 12–16 hours. Then an equal volume of water is added, and the mixture is concentrated at 60° C. under reduced pressure. The gum which forms is washed several times by decantation, and then dissolved in methanol and allowed to stand at room temperature for 12–16 hours. The crystalline product, obtained in a yield of 13.5 g., melts at 161–163° C.; and after recrystallization from methanol, at 162–163° C.

(c) Preparation of 2-sulfanilamido-4-(diethoxy-methyl)-6-methoxy-pyrimidine 13.5 g. 2-($N^4$-acetyl-sulfanilamido)-4-(diethoxy-methyl)-6-methoxy-pyrimidine is refluxed in a solution of 4.4 g. sodium hydroxide in 80 cc. water for 1½ hours; the solution is cooled; and the precipitate (the sodium salt) is filtered off and dissolved in water. This solution is acidified with acetic acid; and the precipitate which forms is filtered off. The product, after recrystallization from aqueous alcohol, melts at 84–85° C. (mixed melting point with starting material), 67° C.).

EXAMPLE 4

*Preparation of the sodium salt of 2-sulfanilamido-4-(diethoxy-methyl)-pyrimidine*

A solution of 35.2 g. 2-sulfanilamido-4-(diethoxy-methyl) pyrimidine in 100 cc. hot alcohol is added to a solution of 2.3 g. sodium in 50 cc. alcohol, and the resulting solution is distilled to dryness under reduced pressure. The residue (the sodium salt) is a white powder readily soluble in water.

The sodium salt of 2-sulfanilamido-4-(diethoxy-methyl)-6-methyl-pyrimidine (Example 2) and of 2-sulfanilamido-4-(diethoxy-methyl)-6-methoxy-pyrimidine (Example 3) may be similarly obtained.

EXAMPLE 5

(a) *Preparation of 2-(p-nitro-benzene-sulfonamido)-4-(diethoxy-methyl)-pyrimidine*

5 g. 2-amino-4-(diethoxy-methyl)-pyrimidine [cf. Example 1(c)] is dissolved in 100 cc. pyridine at 30° C.; and 5.6 g. p-nitro-benzene-sulfonyl chloride is added with stirring over a period of 20 minutes, while maintaining the temperature at 30° C. After the reaction mixture has stood 12–16 hours, the pyridine is removed therefrom by distillation under reduced pressure; and 100 cc. water is added to the residue and distilled off, and this treatment is repeated to remove the remaining pyridine. Then 100 cc. water is added to the residue; and the insoluble product is filtered off, washed with water, and dried.

(b) *Preparation of 2-sulfanilamido-4-(diethoxy-methyl)-pyrimidine*

5 g. 2-(p-nitro-benzene-sulfonamido)-4-(diethoxy-methyl)-pyrimidine and 10 g. powdered iron are thoroughly mixed together in a mortar, and the mixture is added to 30 cc. acetic acid which has been heated to about 70° C., the acetic acid being agitated during the addition, and the addition being in small portions and at such rate that mild ebullition continues throughout the reaction. The reaction mixture is then cooled, water is added, and the liquid portion removed from the solid portion by centrifugation. 25 cc. 10% sodium hydroxide solution is added to the solid portion, and the mixture is stirred thoroughly and centrifuged; and the separated solid portion is again extracted with a 10% sodium hydroxide solution and centrifuged. The (combined) supernatant is filtered, and made just neutral to litmus paper; and the precipitated product is recrystallized from alcohol.

(b) *Alternate*

5 g. 2-(p-nitro-benzene-sulfonamido)-4-(diethoxy-methyl)-pyrimidine is dissolved in 300 cc. alcohol, 2 g. 5% palladized carbon is added, and the mixture is shaken with hydrogen at atmospheric pressure until reduction is complete. The catalyst is filtered off; the filtrate is distilled to dryness under reduced pressure; and the residue (the product) is recrystallized from alcohol.

EXAMPLE 6

(a) *Preparation of 1,1-diethoxy-5-methoxy-2,4-pentanedione*

7.7 g. sodium is covered with 100 cc. toluene, and the mixture is heated to boiling and then stirred vigorously to obtain sodium shot. The toluene is removed by decantation, and the sodium shot is covered with benzene and cooled to 5° C. Then 58.7 g. ethyl diethoxy-acetate is added dropwise with stirring over a 20-minute period; and the solution is cooled to 0° C. and 29.3 g. methoxy-acetone is added dropwise over a period of 1 hour. The solution is stirred at 0° C. for 2 hours, and kept in a refrigerator for 40 hours; then distilled to dryness on a steam bath; and 75 cc. water and 20 cc. glacial acetic acid is added to the residue. The mixture is extracted with ether, and the ether solution is dried and distilled under reduced pressure, the product boiling at 105° C./4 mm. and being obtained in 50% yield.

(b) *Preparation of 2-amino-4-(diethoxy-methyl)-6-methoxymethyl-pyrimidine*

5 g. 1,1-diethoxy-5-methoxy-2,4-pentanedione and 2.5 g. guanidine carbonate are refluxed on an oil bath at 90° C. for 2 hours and then at 130° C. for ½ hour. The reaction mixture is then cooled, 10 cc. water is added, and the solution is acidified with acetic acid. The solution is then filtered, and the filtrate is neutralized with sodium bicarbonate while cooling, the oily precipitate which forms becoming crystalline on standing 12–16 hours. After recrystallization from hexane, the product melts at 65–66° C.

(c) *Preparation of 2-($N^4$-acetyl-sulfanilamido)-4-(diethoxy-methyl)-6-methoxymethyl-pyrimidine*

24.13 g. 2-amino-4-(diethoxy-methyl)-6-methoxymethyl-pyrimidine is dissolved in 100 cc. pyridine, and the solution is cooled to 0° C. Then 23.4 g. acetyl-sulfanilyl chloride is added slowly while maintaining the temperature below 10° C., and the reaction mixture is allowed to stand 12–16 hours. The mixture is then diluted with an equal volume of water and distilled under reduced pressure, the temperature being maintained below 60° C.; and this procedure (water-addition and distillation) is repeated, and the residue is filtered off, washed with water, and dried. The product may be recrystallized from aqueous alcohol.

(d) *Preparation of 2-sulfanilamido-4-(diethoxy-methyl)-6-methoxymethyl-pyrimidine*

43.8 g. 2-($N^4$-acetyl-sulfanilamido)-4-(diethoxy-methyl)-6-methoxymethyl-pyrimidine is dissolved in a solution containing 5.75 g. sodium hydroxide/100 cc.; the resulting solution is refluxed for 1½ hours, cooled, filtered, and acidified with acetic acid; and the resulting precipitate is filtered off, washed, and dried. The product may be recrystallized from aqueous alcohol.

The sodium salt of 2-sulfanilamido-4-(diethoxy-methyl)-6-methoxymethyl-pyrimidine may be obtained by the procedure described in Example 4.

Manifestly, a large number and variety of other compounds of the main general formula may be prepared using the appropriate reactants in the procedure of the foregoing examples, the following being further examples of compounds embraced by the invention (in the preparation of which the corresponding p-nitro-benzene-sulfonamido- or acetyl-sulfanilamido- compounds would be produced, and which compounds may of course be converted into their salts with bases, especially the corresponding sodium salts):

*Example 7.*—2-sulfanilamido-4-(dimethoxy-methyl)-6-methyl-pyrimidine; obtained by using methyl dimethoxy-acetate in place of ethyl diethoxy acetate in the procedure of Example 2(a).

*Example 8.*—2-sulfanilamido-4-(diphenoxymethyl)-6-methyl-pyrimidine; obtained by using ethyl diphenoxy-acetate in place of ethyl diethoxy-acetate in the procedure of Example 2(a).

*Example 9.*—2-sulfanilamido-4-(diethoxymethyl)-6-ethyl-pyrimidine; obtained by using 2-butanone in place of acetone in Example 2(a).

*Example 10.*—2-sulfanilamido-4-(diethoxymethyl)-6-phenyl-pyrimidine; obtained by using acetophenone instead of acetone in the procedure of Example 2(a).

*Example 11.*—2-sulfanilamido-4-(diethoxymethyl)-6-ethylmercapto-pyrimidine; obtained by using ethylmercaptan in place of methanol in Example 3(a).

Although the acylamino compounds of this invention have been illustrated by acetylamino compounds, and the salts have been illustrated by the sodium salts, it is manifest that other acylamino compounds, e. g., propionylamino compounds, and other salts, e. g., calcium salts, may be obtained in the conventional manner, for example by using propionyl-sulfanilyl chloride and calcium hydroxide, respectively.

While the pyrimidine nucleus of the compounds of this invention has been illustrated as having the following structure

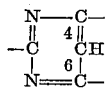

the compounds may actually have the isomeric or tautomeric structure

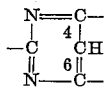

and it is intended that the structural formulas illustrated cover the compounds of this invention whether or not they have this isomeric or tautomeric structure.

The invention may be variously otherwise embodied, within the scope of the appended claims.

I claim:

1. A compound of the group consisting of: compounds of the general formula

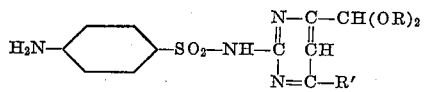

wherein R represents lower alkyl, and R' represents a member of the class consisting of hydrogen, (lower alkyl)-O-, (lower alkyl)-O-(divalent lower alkyl)-, and lower alkyl; and salts of these compounds.

2. A compound of the general formula

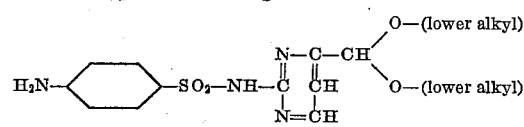

3. 2-sulfanilamido-4-(diethoxy-methyl)-pyrimidine.

4. A compound of the general formula

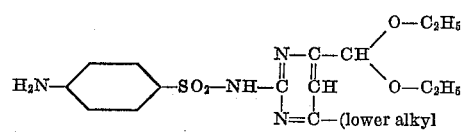

5. 2-sulfanilamido-4-(diethoxy-methyl)-6-methyl-pyrimidine.

6. A compound of the general formula

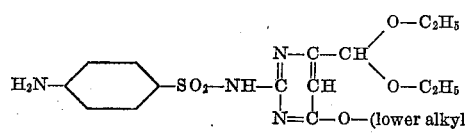

7. 2-sulfanilamido-4-(diethoxy-methyl)-6-methoxy-pyrimidine.

WILLIAM BRAKER.

REFERENCES CITED

The following references are of record in the file of this patent:

UNITED STATES PATENTS

| Number | Name | Date |
|---|---|---|
| 2,309,739 | Roblin | Feb. 2, 1943 |
| 2,351,333 | Gysin | June 13, 1944 |

FOREIGN PATENTS

| Number | Country | Date |
|---|---|---|
| 114,821 | Australia | May 21, 1942 |

OTHER REFERENCES

Journal Amer. Chem. Soc., Aug. 1940, pp. 2002–2005.

Journal Amer. Chem. Soc., Aug. 1941, pp. 2188–2189.

Journal Amer. Chem. Soc., Nov. 1941, pp. 3028–3030.

Journal Amer. Chem. Soc., Oct. 1942, pp. 2340–2342.